United States Patent [19]

Takenaka et al.

[11] Patent Number: 5,514,735

[45] Date of Patent: May 7, 1996

[54] UNDER-COATING COMPOSITIONS OF CHLORINATED POLYOLEFINS AND EPOXY RESINS

[75] Inventors: Tatsuya Takenaka, Hiroshima; Mikio Fukunaga, Nishinomiya, both of Japan

[73] Assignees: Daikyo Co., Ltd, Hiroshima; Shinto Paint Co. Ltd., Hyogo, both of Japan

[21] Appl. No.: 290,513

[22] Filed: Aug. 15, 1994

Related U.S. Application Data

[63] Continuation of Ser. No. 929,112, Aug. 13, 1992, abandoned.

[30] Foreign Application Priority Data

Feb. 13, 1992 [JP] Japan .................. 4-026593

[51] Int. Cl.⁶ .................. C08L 63/00; C08L 23/28
[52] U.S. Cl. .................. 523/435; 525/120
[58] Field of Search .................. 525/120; 523/435

[56] References Cited

U.S. PATENT DOCUMENTS

| | | | |
|---|---|---|---|
| 3,013,998 | 12/1961 | Battaglio | 525/120 |
| 3,107,228 | 10/1963 | Capuccio | 525/120 |
| 3,196,123 | 7/1965 | Wheelock | 525/120 |
| 4,683,264 | 7/1987 | Urata | 525/120 |

FOREIGN PATENT DOCUMENTS

| | | |
|---|---|---|
| 42532 | 2/1977 | Japan . |
| 50971 | 5/1981 | Japan . |
| 76433 | 6/1981 | Japan . |
| 63-50381 | 10/1988 | Japan . |
| 1-16414 | 3/1989 | Japan . |
| 2099001 | 12/1982 | United Kingdom . |
| 2131439 | 6/1984 | United Kingdom . |

OTHER PUBLICATIONS

JP 56–76433 Abstract, Derwent Inc. AN#81–57991, McLean, VA (1981).

JP 56–50971 Abstract, Derwent Inc, AN#81–46573, McLean, VA (1981).

*Primary Examiner*—John C. Bleutge
*Assistant Examiner*—D. R. Wilson
*Attorney, Agent, or Firm*—Foley & Lardner

[57] ABSTRACT

An under-coating composition comprising 100 weight parts of chlorinated polyolefin resin including 15 to 35 wt. % of chloride and 1 to 70 weight parts of epoxy resin having an equivalent epoxy weight of less than or equal to 600 is capable of eliminating the pretreatment of a surface of polyolefin resin substrate which is to be overcoated and improving the adhesion strength between the over-coatings and the surface of the substrate of polyolefin resin. Especially, the coating surface according to the present invention is much improved in resistance to hot water and resistance to humidity. Further, the use of the under-coating composition according to the present invention permits an overcoating film to have a high resistance to water decoloration.

6 Claims, No Drawings

UNDER-COATING COMPOSITIONS OF CHLORINATED POLYOLEFINS AND EPOXY RESINS

This application is a continuation of U.S. application Ser. No. 07/929,112 filed Aug. 13, 1992 now abandoned.

BACKGROUD OF THE INVENTION

The present invention relates to an under-coating composition which is placed between an over-coating and a substrate made of polyolefin resin sheet and moldings, and which is superior in adhesion ability to the over-coating and the substrate resin.

Hitherto, polypropylene resin is widely used in various fields as a useful plastic material, but has a resin characteristic of a low polarity and a high crystallinity. Therefore, there is a practical problem which prevents the use of epoxy, alkyd, acryl, melamine and urethan resins as the coating materials for polypropylene resin sheet and moldings, because these coating materials have a poor adhesion ability to the polypropylene resin sheet and moldings. One coating method for the polypropylene sheet and moldings is first to oxidize the surface thereof with plasma, flame or ozone gas in order to etch the surface or provide the surface with a surface polarity and then to carry out the coating process. A second method is to apply an under-coating material to the surface of polypropylene resin sheet and moldings in order to improve the adhesion ability to an over-coating material and to the surface of polypropylene resin.

As such an under-coating material, there have been reported compositions made of 1. chlorinated polypropylene, chlorinated ethylene rosin ester and petroleum material of an aromatic group (Japanese Patent Publication (examined) No. 58-8734) and 2. chlorinated polyolefin methyl methacrylate composition (Japanese Patent Publication (examined) No. 58-71966) and 3. chlorinated polyolefin methacrylic acid amide composition (Japanese Patent Publication (examined) No. 57-198763).

However, the first method to improve the adhesion ability comprises a complicated working step to oxidize the surface with plasma, flame or ozone gas and further has a problem that the moldings of a complicated shape are hard to treat uniformly and sometimes have a part which has a poor adhesion ability to the polyolefin resin.

On the other hand, the second method requires no surface treatment mentioned above, but requires a pretreatment such as a de-oiling process of the surface with TCE (trichloro ethane) vapor or a wiping process with IPA (isopropyl alcohol) and toluene wiping for improving the resistance of the adhesion strength to hot water and humidity.

Therefore, an object of the present invention is to provide an under-coating composition which has a high adhesion ability to a polyolefin resin sheet or moldings without the pretreatment of the surface mentioned above in accordance with the conventional method and which is superior in resistance to hot water or humidity.

DETAILED DESCRIPTION OF THE INVENTION

In order to solve the problem mentioned above, the present invention provides an under-coating composition for a polyolefin resin system which comprises 100 weight parts of chlorinated polyolefin resin including 15 to 35 wt. % of chloride and 1 to 70 weight parts of 10 epoxy resin having an equivalent epoxy of or equal to less than 600.

The chlorinated polyolefin resin used in the present invention comprises, for example, α- olefin single polymers or copolymers such as ethylene, propylene, 1-butene, 3-methyl-1-butene, 3-methyl-1-pentene and copolymers of α-olefin with other single polymers such as chlorinated copolymers of ethylene-vinylacetate, ethylene-butadiene, ethylene-acrylic ester. It is preferable to use chlorinated polypropylene, chlorinated polyethylene, chlorinated polypropylene-ethylene copolymer, chlorinated ethylene-vinylacetate and a mixture of chlorinated polyolefins mentioned above. The chlorination rate of 15 to 35 weight % is used since the chlorination rate of 15 weight % or less makes a resultant compound with less solubility to a solvent. This lowers the stability as a resin coating material. On the other hand, the chlorination rate of 35 weight % or more lowers the adhesion strength to polyolefin resin.

On the other hand, the under-coating comprising the polyolefin resin according to the present invention includes the epoxy resin having an epoxy equivalent weight of or equal to less than 600. The epoxy equivalent weight of more than 600 lowers the solubility in the chlorinated polyolefin and the low epoxy equivalent weight of less than 50 results in a coating film of a lower density of bridge formation and comes to have a poor adhesion strength.

Available epoxy resins include a sorbitol type, a glycol ether type, and a bisphenol type. The epoxy resin of the sorbitol type has an epoxy equivalent weight of or equal to less than 170, the glycol ether type has an epoxy equivalent weight of 500 to 600, and the bisphenol type has an epoxy equivalent weight of 180 to 200.

Especially, it has been found that the use of the epoxy resin having a water solubility of less than 50% improves resistance to water decoloration. Usually, as the epoxy resin having a low water solubility there may be selected an epoxy resin having a lower amount of hydroxyl groups in the structure. The water solubility referred to herein is the solubility when resin (10 weight %) is dissolved at room temperature in water (90 weight %). A water solubility of 100% identifies the condition that when the solution is caused to flow on a glass plate, there is no residual resin on the glass plate. A water solubility of 50% is the condition that 50% of the resin is undissolved in the solution and is left as a residue. The mass for calculating the water solubility can be determined by measuring the residual volume with a cylinder and by multiplying the measured volume by the density of the resin.

An operable mixing ratio of under-coating composition according to the present invention is 1 to 70 weight parts of the epoxy resin and more preferably 4 to 50 weight parts of the epoxy resin to 100 weight parts of the chlorinated polyolefin resin. Any under-coating compositions without the above range show a poor adhesion strength to the polyolefin resin. In addition, an under-coating composition having the epoxy resin of less than 1 weight part also can be inferior in the paint stability.

On the other hand, it is preferable to add 0.1 to 15 weight % of a tertiary amine to the under-coating composition according to the present invention. This makes it possible to promote a curing reaction of the coating composition and to increase the density of bridge formation thereby forming a strong coating film. As representative examples of the tertiary amine, there may be used triethylamine, tributylamine, N-methyl morpholine, pyridine and quinoline.

The under-coating material is applied to the surface of the polyolefin resin and dried naturally (20° C.× 10 min) or quickly (60° C.×5 min) and is coated with an over-coating material. It is preferable that the over-coating material may be selected from the group consisting various kinds of two liquid urethane paint, one liquid urethane paint and melamine paint.

Accordingly, use of the under-coating material according to the present invention can eliminate the pretreatment of the surface of polyolefin resin and improve the adhesion strength between the over-coatings and the surface of the substrate of polyolefin resin. Especially, the adhesion strength obtained with the under-coating according to the present invention is much improved in the resistance to hot water and the resistance to humidity. The reason for this improvement is not yet clear. The possible reason is first to increase the wettability of the surface of polyolefin resin, second to leave hardly any internal stress and third to form a strong paint film having bridges formed therein by itself.

Accordingly, an use of the under-coating material according to the present invention results in an improved workability for painting. In a case of a bath involving repeated exposure to hot water, the under-coating of the present invention applied to the surface thereof becomes very superior in the durability.

In a water resistance test requiring a high resistance to water decoloration of the over paint film, the use of the under-coating material having a water soluble rate of 50% or less makes it possible to ensure a sufficient adhesion strength and to improve the water resistance and the resistance to the water decoloration of the over-coating film. That is, the over-coating film exhibits hardly any peeling of the paint film, generation of blister or water decoloration for a long time period.

EXAMPLES

The following description will be directed to the embodiment according to the present invention. It is to be noted that a "part" refers to a weight part hereinafter.

EXAMPLE 1

Chlorinated polypropylene having chlorine of 25 weight % included therein is dissolved in toluene to form a toluene solution containing 20% of chlorinated polypropylene. Then, 100 parts of the toluene solution is mixed with 2 parts of sorbitol epoxy resin (having an epoxy equivalent weight of 170, a mean molecular weight of 630 and four functional groups). The resultant under-coating composition is applied to a polypropylene plate without pretreatment by means of a spray method and is dried for 5 minutes at room temperature. Then, the under-coating film is of a thickness of 5 to 10 micron and further is coated with conventional two liquid urethane paint and is kept at room temperature for three days after drying at 70° C. for 30 minutes. The film quality of the resultant paint film is tested and the result is shown in Table 1.

EXAMPLE 2

Chlorinated polypropylene having chlorine of 25 weight % included therein is dissolved in toluene to form a toluene solution containing 20% of chlorinated polypropylene. Then, 100 parts of the toluene solution is mixed with 2 parts of glycol ether epoxy resin (having an epoxy equivalent weight of 583, a mean molecular weight of 1100 and two functional groups). The resultant under-coating composition is applied to a polypropylene plate without pretreatment in a similar way to that of example 1. The film quality of the resultant paint film is tested and the result is shown in Table 1.

EXAMPLE 3

Chlorinated polypropylene having chlorine of 25 weight % included therein is dissolved in toluene to form a toluene solution containing 20% of chlorinated polypropylene. The toluene solution of 100 parts is mixed with 10 parts of glycol ether epoxy resin (having an epoxy equivalent weight of 583, a mean molecular weight of 1100 and two functional groups). The resultant under-coating composition is applied to a polypropylene plate without pretreatment in a similar way to that of example 1. The film quality of the resultant paint film is tested and the result is shown in Table 1.

EXAMPLE 4

Chlorinated polypropylene having chlorine of 25 weight % included therein is dissolved in toluene to form a toluene solution containing 20% of chlorinated polypropylene. The toluene solution of 100 parts is mixed with 1.43 parts of sorbitol epoxy resin (having an epoxy equivalent weight of 170, a mean molecular weight of 630 and four functional groups)and 0.3 part of tributylamine as the tertiary amine. The resultant under-coating composition is applied to a polypropylene plate without pretreatment in a similar way to that of example 1. The film quality of the resultant paint film is tested and the result is shown in Table 1.

COMPARATIVE EXAMPLE

Chlorinated polypropylene having chlorine of 25 weight % included therein is dissolved in toluene to form a toluene solution containing 20% of chlorinated polypropylene. The toluene solution is used as the under-coating material and is applied to a polypropylene plate without pretreatment in a similar way to that of Example 1. The film quality of resultant paint film is tested and the result is shown in Table 1.

TESTING METHOD

Adhesion Strength (Square Pattern Test)

A coating on a substrate is provided with a square pattern of one hundred pieces (10×10) of 2 mm square by using a cutting knife. A cellophane tape is applied to the square pattern and is peeled off at a peeling rate of more than 0.5 mm/s, while holding a corner of the tape, in a direction of a right angle with respect to the square pattern. The adhesion strength is determined by the number of the square pieces peeled off.

Adhesion Strength (Cross Cut Test)

A coating is provided with breaks crossing at an angle of 30 degrees with a knife and has a cellophane tape applied to an area with breaks thereon. The cellophane tape is peeled off from the area at a speed more than 0.5 mm/s, while holding a corner of the tape, in a direction of a right angle with respect to the cellophane tape. The adhesion strength is measured by the peeling condition.

Secondary Adhesion Strength Test (Square Pattern Test)

A coating applied to a substrate is placed in a water bath including deionized water or distilled water at a constant temperature of 40° C. for 240 hours. Then, the coating is dried at a room temperature for one hour and subjected to the adhesion strength test (square pattern test).

Peel Strength (180°)

A test piece of a coating (length of 5 cm and a width of 1 cm) has a heat resistance tape applied thereto over an area of 50% thereof and then is subjected to a coating formation in a conventional method. The coating is kept at a room temperature for 72 hours. The heat resistance tape is peeled off at a direction of 180° against the coating in a way not to cut the coating.

Test Result

As apparent from the results shown in Table 1, the under-coating material according to the present invention shows no difference of test results between procedures with and without the pretreatment and permits the over-coating to be provided with a peeling strength more than 600 g/cm. The comparison case indicates the testing result changes with the pretreatment procedures and cannot achieve a satisfactory peeling strength.

|   |   | Example 1 |   | Example 2 |   |
|---|---|---|---|---|---|
| 1 | Pretreatment | No | IPA wipe | No | IPA wipe |
| 2 | Adhesion (square) | 100/100 | 100/100 | 100/100 | 100/100 |
| 3 | Adhesion cross cut | good | good | good | good |
| 4 | 2nd adhesion | 100/100 | 100/100 | 100/100 | 100/100 |
| 5 | Peel strength (180°) | 600 | 600 | 800 | 800 |

|   | Example 3 |   | Example 4 |   | Comparison |   |
|---|---|---|---|---|---|---|
| 1 | No | IPA wipe | No | IPA wipe | No | IPA wipe |
| 2 | 100/100 | 100/100 | 100/100 | 100/100 | 0/100 | 20/100 |
| 3 | good | good | good | good | bad | bad |
| 4 | 100/100 | 100/100 | 100/100 | 100/100 | 0/100 | 5/100 |
| 5 | 800 | 800 | 900 | 900 | 200 | 300 |

3. Cross Cut test: good = No presence of peeling; bad = Presence of peelig
Peel strengh = g/cm It is noted that the substrate is first coated with a primer in the above Example and the comparison case. The overcoating is carried out with a urethane over-coating material of a two liquid system and dried at 70° C. for 30 minutes.

Test For a Resistance to Water Decoloration

The investigation is carried out for the effect of the water solubility of the epoxy resin used in Examples 1 and 3 mentioned above and Examples 5 to 8 described below and comparison cases 1 to 3. Table 2 shows the relation between the water solubility and resistance to water decoloration together with the adhesion strength or the peeling strength. It is to be noted that the resistance to water decoloration is carried out by dipping the test pieces in the bath of water at 40° C. for 240 hours (ten days) and is judging with a visual inspection in comparison with the reference piece.

EXAMPLES 5 to 8

Chlorinated polypropylene having chlorine of 25 weight % included therein is dissolved in toluene to form a toluene solution containing 20% of chlorinated polypropylene. The toluene solution of 100 parts is mixed with (a) sorbitol epoxy resin (wherein the epoxy equivalent weight, mean molecular weight and functional groups are shown in Table 2. The water solubility is less than 50%) or glycol ether epoxy resin (wherein the epoxy equivalent weight, mean molecular weight and functional groups are shown in Table 2. The water solubility is less than 50%.) The addition amount of the additives are shown in Table 2. The resultant under-coating material is applied to a polypropylene plate without pretreatment by a spray method and is dried for 5 minutes at a room temperature. Then, the under-coating film is of a thickness of 5 to 10 micron and further is coated with conventional two liquid urethane paint and is kept at room temperature for three days after drying at 70° C. for 30 minutes. The film quality of resultant paint film is tested and the result is shown in Table 2.

COMPARISON CASES 1 TO 3

Chlorinated polypropylene having chlorine of 25 weight % included therein is dissolved in toluene to form a toluene solution containing 20% of chlorinated polypropylene. The toluene solution of 100 part is mixed with sorbitol epoxy resin (the epoxy equivalent weight, mean molecular weight and functional groups are shown in Table 2. The water solubility is less than 50%.) or glycol ether epoxy resin (the epoxy equivalent weight, mean molecular weight and functional groups are shown in Table 2. The water solubility is less than 50%.). The addition amounts of the additives are shown in Table 2. The resultant under-coating material is applied to a polypropylene plate without pretreatment in a similar way to that of Example 1. The film quality of resultant paint film is tested and the result is shown in Table 2.

TABLE 2

|   |   |   | Present invention |   |   |
|---|---|---|---|---|---|
|   |   |   | Ex. 1 | Ex. 3 | Ex. 5 |
| Composition | Primer liquid composition | *a (1) | same | same | same |
|   |   | Wt. part sorbitol (2) | 2 |   |   |
|   |   | Wt. part glycol ether (3) |   | 10 | 10 |
|   |   | epoxy equivalent (4) | 170 | 583 | 180 |
|   |   | Mean molecular wt. (5) | 630 | 1100 | 150 |
|   |   | Functional group (6) | 4 | 2 | 3 |
|   |   | Water-solubility (7) | 30% | 5 | 50 |
|   | Application | *b (8) | same | same | same |
| Test result after 3 | Adhesion *c (9) |   | good | good | good |
|   | Decoloration (10) |   | good | good | good |
|   | Peeling (g/cm) (11) |   | 600 | 800 | 800 |
|   | total judge (12) |   | good | good | good |

TABLE 2-continued

|      | Compari son 1 | Compari son 2 | Ex. 6 | Ex. 7 | Ex. 8 | Compari son 3 |
|------|---------------|---------------|-------|-------|-------|---------------|
| (1)  | same          | same          | same  | same  | same  | same          |
| (2)  | 4             | 4             | 7     |       |       |               |
| (3)  |               |               |       | 5     | 2     | 5             |
| (4)  | 230           | 400           | 180   | 600   | 583   | 30            |
| (5)  | 800           | 1000          | 850   | 1200  | 950   | 450           |
| (6)  | 4             | 4             | 4     | 2     | 2     | 2             |
| (7)  | 70            | 55            | 33    | 26    | 2     | 100           |
| (8)  | same          | same          | same  | same  | same  | same          |
| (9)  | good          | good          | good  | good  | good  | good          |
| (10) | Decolor       | Weak decolor  | good  | good  | good  | Decolor       |
| (11) | 600           | 600           | 800   | 800   | 760   | 600           |
| (12) | bad           | bad           | good  | good  | good  | bad           |

*a: Toluene solution including 20% of chlorinated polypropylene which has 25 weight % of chlorine formed therein.
*b: The toluene solution is applied to a P.P plate (with and without pretreatment) by a spray method and dried at a room temperature for five minutes. The thickness is of about 5 to 10 micron. Then, urethane over-coating of a two liquid system is applied and dried at 70° C. for 30 minutes.
*c: The adhesion is carried out by a square pattern method, a cross break test and a secondary adhesion test.

From the testing results of Examples 5 to 8 and comparison cases 1 and 2, it is clearly concluded that the adhesive strength and the peeling strength aimed by the present invention are achieved by using the epoxy resin which has an epoxy equivalent of 50 to 600 and an addition amount within the determined range in accordance with the present invention. However, the epoxy resin used in Examples 5 to 8 has a water solubility less than 50%, but the epoxy resin used in the comparison cases 1 and 2 has a water solubility more than 50%. Accordingly, it is clear that the water solubility has a strong effect on the resistance to water decoloration of the over-coating film.

What is claimed is:

1. An under-coating composition suitable for coating a polyolefin resin product without pretreatment, which consists essentially of:
   a. 100 weight parts of chlorinated polyolefin resin including 15 to 35 wt. % of chloride, said chlorinated polyolefin being selected from the group consisting of chlorinated polypropylene, chlorinated polyethylene, chlorinated polypropylene-ethylene copolymer, chlorinated ethylene-vinylacetate and a mixture of chlorinated polyolefins,
   b. 1 to 70 parts of epoxy resin that has an epoxy equivalent weight of less than or equal to 600 and a water solubility of 50% or less in a 10 wt. % aqueous mixture at room temperature as a resin component, and
   c. an amount of organic solvent sufficient to make a coating solution.

2. An under-coating composition suitable for coating a polyolefin resin product without pretreatment according to claim 1, wherein said epoxy resin is selected from the group consisting of a sorbitol epoxy resin having an epoxy equivalent weight of less than or equal to 170, a glycol ether epoxy resin having an epoxy equivalent weight of 500 to 600 and a bisphenol epoxy resin having an epoxy equivalent weight of 180 to 200.

3. An under-coating composition suitable for coating a polyolefin resin product without pretreatment according to claim 1, further comprising 0.1 to 15 weight % of a tertiary amine.

4. An under-coating composition suitable for coating a polyolefin resin product without pretreatment, which consists essentially of:
   a. 100 weight parts of chlorinated polyolefin resin including 15 to 35 wt. % of chloride, said chlorinated polyolefin being selected from the group consisting of chlorinated polypropylene, chlorinated polyethylene, chlorinated polypropylene-ethylene copolymer, chlorinated ethylene-vinylacetate and a mixture of chlorinated polyolefins,
   b. 1 to 70 parts of epoxy resin that has an epoxy equivalent weight of less than or equal to 600 as a resin component, and
   c. an amount of organic solvent sufficient to make a coating solution.

5. An undercoating composition suitable for coating a polyolefin resin product without pretreatment as claimed in claim 4, wherein the epoxy resin is selected from the group consisting of a sorbitol epoxy resin, a glycol ether epoxy resin and a bisphenol epoxy resin.

6. An undercoating composition suitable for coating a polyolefin resin product without pretreatment as claimed in claim 4, additionally comprising 0.1 to 15 weight % of a tertiary amine.

* * * * *